United States Patent
Esfahani

(10) Patent No.: US 11,607,817 B2
(45) Date of Patent: Mar. 21, 2023

(54) ROBOTIC GRIPPER WITH VARIABLE STIFFNESS ACTUATORS AND METHODS FOR SAME

(71) Applicant: The Research Foundation for The State University of New York, Buffalo, NY (US)

(72) Inventor: Ehsan T. Esfahani, Amherst, NY (US)

(73) Assignee: The Research Foundation for The State University of New York, Amherst, NY (US)

( * ) Notice: Subject to any disclaimer, the term of this patent is extended or adjusted under 35 U.S.C. 154(b) by 405 days.

(21) Appl. No.: 16/618,591

(22) PCT Filed: Jun. 4, 2018

(86) PCT No.: PCT/US2018/035919
§ 371 (c)(1),
(2) Date: Dec. 2, 2019

(87) PCT Pub. No.: WO2018/223148
PCT Pub. Date: Dec. 6, 2018

(65) Prior Publication Data
US 2020/0147813 A1    May 14, 2020

Related U.S. Application Data

(60) Provisional application No. 62/514,498, filed on Jun. 2, 2017.

(51) Int. Cl.
*B25J 15/02* (2006.01)
*B25J 9/16* (2006.01)
(Continued)

(52) U.S. Cl.
CPC ......... *B25J 15/0286* (2013.01); *B25J 9/1633* (2013.01); *B25J 19/02* (2013.01); *B25J 19/068* (2013.01)

(58) Field of Classification Search
CPC ...... B25J 15/0286; B25J 9/1633; B25J 19/02; B25J 19/068
See application file for complete search history.

(56) References Cited

U.S. PATENT DOCUMENTS

| 4,693,505 A | 9/1987 | Dimeo |
| 4,699,414 A | 10/1987 | Jones |
(Continued)

FOREIGN PATENT DOCUMENTS

| CN | 107263514 A | 10/2017 |
| WO | 2011/144796 A1 | 11/2011 |

OTHER PUBLICATIONS

Bock, T., et al., Design of a Gripping System for the Automated Assembly of Large Building Modules, Proc. 17th Int. Symp. Automation and Robotics in Construction (ISARC'OO), 2000, pp. 919-925.
(Continued)

*Primary Examiner* — Stephen A Vu
(74) *Attorney, Agent, or Firm* — Hodgson Russ LLP

(57) ABSTRACT

Safety is one of the most important factors in the robot interaction with unknown and dynamic environments. Recent studies have shown that the use of compliant components as a solution to the safety issue, especially in the physical human-robot interaction. To overcome performance degradation caused by including compliant elements into the systems, variable stiffness approaches have been introduced at the cost of an extra actuator. A variable stiffness gripper is presented. Embodiments of the disclosed gripper may have, for example, with two parallel fingers (jaws). Compliance of the system may be generated by using magnets as the nonlinear springs. Based on the presented
(Continued)

design, the position and stiffness level of the fingers can be adjusted simultaneously by changing the air gap between the magnets.

13 Claims, 12 Drawing Sheets

(51) Int. Cl.
*B25J 19/02* (2006.01)
*B25J 19/06* (2006.01)

(56) References Cited

U.S. PATENT DOCUMENTS

| | | |
|---|---|---|
| 4,707,013 A | 11/1987 | Vranish et al. |
| 5,050,919 A | 9/1991 | Yakou |
| 5,062,855 A | 11/1991 | Rincoe |
| 5,242,259 A | 9/1993 | Yeakley |
| 5,947,539 A | 9/1999 | Long et al. |
| 6,076,875 A | 6/2000 | Neff et al. |
| 6,147,422 A | 11/2000 | Delson et al. |
| 6,386,609 B1 | 5/2002 | Govzman |
| 6,533,531 B1 | 3/2003 | Nguyen et al. |
| 6,626,476 B1 | 9/2003 | Govzman et al. |
| 7,300,082 B2 | 11/2007 | Rogers et al. |
| 7,513,546 B2 | 4/2009 | Vranish |
| 7,784,603 B2 * | 8/2010 | Burgmeier ............. B65G 47/90 198/803.6 |
| 8,297,671 B2 * | 10/2012 | Knieling ............. B65G 47/847 294/90 |
| 8,342,314 B2 * | 1/2013 | Michel ................. B65G 47/905 198/803.6 |
| 8,573,070 B2 * | 11/2013 | Sarh ....................... B25J 13/086 901/34 |
| 8,701,872 B2 * | 4/2014 | Fahldieck ............. B65G 47/90 198/803.6 |
| 9,067,324 B2 | 6/2015 | Batsuoka |
| 9,089,977 B2 | 7/2015 | Claffee et al. |
| 2018/0056524 A1 | 3/2018 | Birkmeyer et al. |

OTHER PUBLICATIONS

Kratchman, L.B., et al., Guiding Elastic Rods With a Robot-Manipulated Magnet for Medical Applications, IEEE Trans Robot. Dec. 1, 2016, vol. 33, No. 1, pp. 227-233.

* cited by examiner

ROBOTIC GRIPPER WITH VARIABLE STIFFNESS ACTUATORS AND METHODS FOR SAME

CROSS-REFERENCE TO RELATED APPLICATIONS

This application claims priority to U.S. Provisional Application No. 62/514,498, filed on Jun. 2, 2017, the disclosure of which is incorporated herein by reference.

FIELD OF THE DISCLOSURE

The present disclosure relates to robotic grippers, and in particular, robotic grippers with variable-stiffness actuators.

BACKGROUND OF THE DISCLOSURE

The reliable grasping and handling of objects is essential to industrial robots as well as service robots for physical human-robot interaction (pHRI). Moreover, safety becomes an important issue when a robot needs to handle fragile or sharp objects in uncertain and dynamic environments. Considerable research effort has been directed towards the development of methods for increasing human safety in pHRI. For instance, the safety analysis of soft-tissue injuries caused by sharp tools grasped by a robotic arm has been investigated experimentally and reported.

To address such safety issues, compliant interaction methods have been introduced by the robotic community. Proposed strategies to control the joint compliance can be divided into active and passive approaches. In active control, compliant interaction with the environment is mimicked by using sensor data and force control of rigid joints. However, active controls have a number of limitations in terms of sensor failure, bandwidth, and the cost of instruments. In fact, performance of active compliance controls is highly dependent to the sensor feedbacks and they are susceptible to the sensor failure and reduction in the sampling rate. In addition, another limitation of such systems is limited mechanical and electrical bandwidth, in terms of shock tolerance and energy storage, which is essential to ensure the safety of grasped objects during inadvertent collisions. Since the control bandwidth is always limited in active control methods, the controller cannot react to high frequency contacts such as shocks and impacts immediately.

Due to the aforementioned limitations of active control methods, passive compliance has received increasing attention in recent years. Including elastic elements into the design of robotic joints reduces stiffness and ensures an infinite disturbance bandwidth. Depending on whether the stiffness of a compliant joint is constant or adjustable, it is called a series-elastic actuator (SEA) or a variable-stiffness actuator (VSA), respectively.

In an SEA, generally, an elastic element such as a mechanical spring is employed in series with a stiff actuator to provide inherent compliance. The elastic element of an SEA acts as a low-pass filter and absorbs the impact energy from or to the actuator. In this case, the generated output force of the joint can be calculated by measuring the deflection of the elastic element. However, SEAs have limitations in terms of trade-off between position accuracy and energy absorbing capacity because these features are highly dependent to the stiffness value which is constant in the case of an SEA. To overcome this issue, actuators with adjustable stiffness have been proposed.

VSAs provide users with not only the intrinsic characteristics of an SEA (e.g., shock tolerance and impact energy storage), but also a range of adjustable stiffness. However, VSAs often require two actuators for the simultaneous control of equilibrium position and stiffness of the system. Most VSAs are capable of performing tasks in either fully stiff or safe compliant modes, so the level of compliance can be adapted according to the task requirements. A low stiffness configuration allows a system to provide fine force control with light load capacity. Higher levels of stiffness lead to faster transfer of actuator power to the load, and consequently, faster position control and heavier load capacity.

Many different mechanisms for changing the stiffness level of VSAs have been proposed in the literature. These different mechanisms can be categorized into three groups: a spring-preload group which is similar to human joints and the stiffness varies by altering the preload of elastic elements; a group in which the level of stiffness is altered by changing the transmission ratio between the load and spring; and a group in which the stiffness is adjusted by influencing the properties of elastic elements. In addition to the variation of stiffness, different mechanisms can be implemented in terms of motor configuration. Generally, motors can be used in either antagonistic or independent configurations.

Despite the various known VSA mechanisms, robot grippers with variable-stiffness actuation and rigid fingers are relatively little studied. By utilizing the concept of VSA in the design of robotic grippers, the performance of manipulation tasks can be improved from different point of views such as safety, grasp robustness and the potential of performing dynamic manipulation. Intrinsic compliance of such grippers allows the controllers to estimate contact forces without the need for force sensors via measuring the deflection of elastic elements, however, an appropriate model of force-deflection is required. Moreover, by employing a gripper with variable-stiffness fingers mounted to a commercial arm, some aspects of a fully VSA-based arm can be achieved to accomplish tasks such as assembly, polishing, and improving safety during handling fragile or sharp objects in pHRI.

BRIEF SUMMARY OF THE DISCLOSURE

A variable stiffness gripper with two fingers is disclosed. Magnetic springs in a repulsive configuration may be used as the non-linear preload springs with an antagonistic actuators setup. Two servo motors may be used to adjust the position and stiffness of the gripper simultaneously by changing the position of the magnets. The disclosed design provides the gripper with the capability of external force estimation at each finger. Magnetic repulsion force and stiffness are modeled using an experimentally fitted model and verified through a set of experiments with different setups of stiffness. An experiment was conducted to illustrate the functionality of the developed gripper to improve grasping robustness and safety. In this experiment, the compliance of an exemplary gripper was investigated in a task where a robotic arm equipped with the designed gripper grasped a fragile object and an unexpected collision happened. The results demonstrate the effectiveness of the disclosed mechanism for a two finger gripper.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 1:
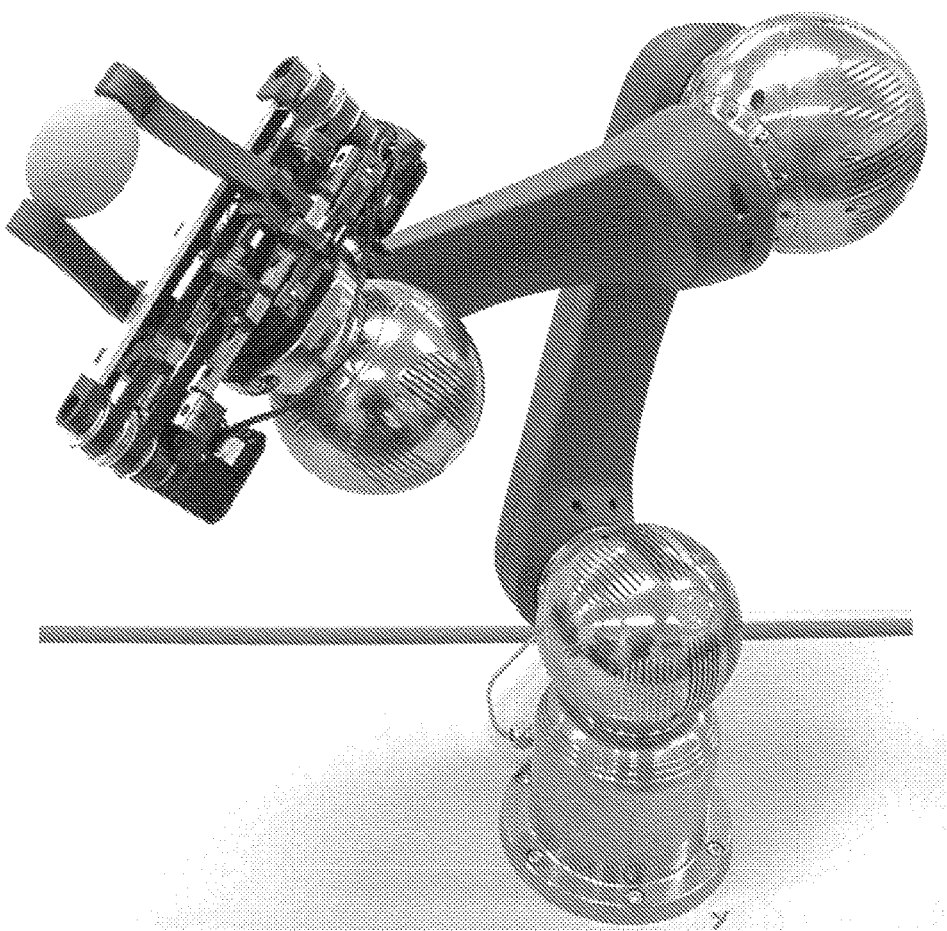
FIG. 1 is a prototype of the variable stiffness gripper mounted at the end-effector of a robotic manipulator

The present disclosure can be embodied as gripper, such as a two-finger gripper, with adjustable stiffness (see, e.g., FIG. 1). The gripper takes advantage of magnetic repulsion forces as the nonlinear elastic element. In embodiments, simple linear motion units may be used to adjust the displacement of the magnets by position control of two electric servo motors such that the equilibrium position and stiffness of the fingers can be controlled simultaneously.

Although, in general, many known VSAs can be used as the actuator of a robotic gripper, the design of the present gripper provides users with more functionality such as, for example, low friction, lightness, and compactness. Moreover, the present mechanism can provide controllers with contact force measurement for each finger of the gripper individually. Another characteristic of the present design is the compliance motion of the gripper when an object is grasped and an external disturbance acts on one of the fingers. This property can improve the robustness of grasping when inadvertent collisions occur due to, for example, arm movements.

Figure 2:
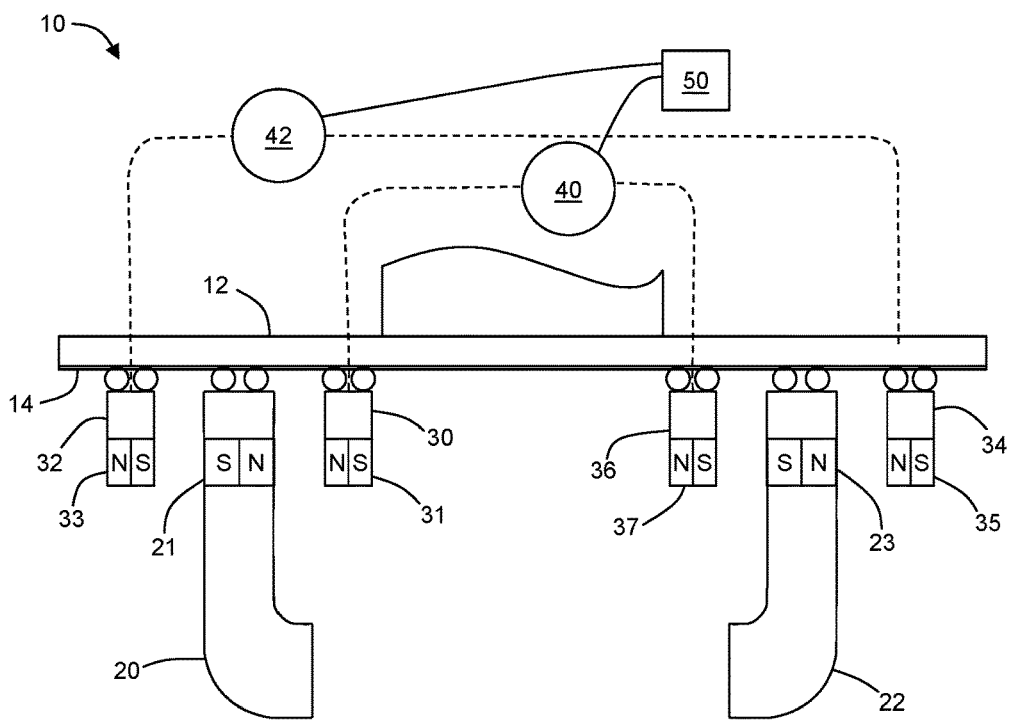
FIG. 2 is a diagram of a gripper according to an embodiment of the present disclosure.

In a first aspect, the present disclosure may be embodied as a robotic gripper 10 (see, e.g., FIG. 2). The gripper 10 has a frame 12 with a guideway 14. A first finger 20 is configured to translate along the guideway 14. The first finger 20 has a magnet 22 with a north pole (N) and a south pole (S). The magnet 22 is disposed in the first finger 20 such that a magnetic force acting on the magnet 21 causes the first finger 20 to move—i.e., translate along the guideway 14. For example, the magnet 21 is configured such that a repelling force at the north pole of the magnet 21 will cause the first finger 20 to move in a direction away from the repelling force (in an N→S direction with respect to the magnet 22). Similarly, a repelling force at the south pole of the magnet 21 will cause the first finger 20 to move in a direction away from the repelling force (in an S→N direction with respect to the magnet 21).

The gripper 10 has a first guide 30 having a magnet 31 with a north pole configured to cooperate with the north pole of the first finger 20 magnet 21 to cause a repulsive force between the first guide 30 and the first finger 20. A first actuator 40 is operable to move the first guide 30. The gripper 10 also includes a second guide 32 having a magnet 33 with a south pole configured to cooperate with the south pole of the finger magnet 21. In this way, the second guide 32 causes a repulsive force between the second guide 32 and the first finger 20. As the first guide 30 and the second guide 32 each cause repulsive forces acting on the first finger 20 in opposite directions, the first finger 20 will find an equilibrium point between the first guide 30 and the second guide 32. A second actuator 42 is operable to move the second guide 32. Either or both of the first actuator 40 and/or the second actuator 42 may be, for example, a servo motor.

The gripper may further having a controller 50 in electrical communication with the first actuator 40 and the second actuator 42. Although described as a controller, it is to be appreciated that the controller 50 may be implemented in practice any suitable hardware, such as, for example, a processor programmed with software. Also, its functions as described herein may be performed by one unit, or divided up among different components. Program code or instructions for such a processor to implement the various methods and functions described herein may be stored in processor readable storage media, such as a memory.

The controller 50 may be configured to move the first finger 20 along the guideway 14 by moving the first guide 30 and the second guide 32 in the same direction as each other. The controller 50 may be further configured to increase the compliance of the first finger 20 by moving the first guide 30 away from the second guide 32 thereby increasing the gaps between the first finger 20 and each of the first and second guides. Similarly, the controller 50 may be further configured to decrease the compliance of the first finger 20 by moving the first guide 30 toward the second guide 32 thereby decreasing the gaps between the first finger 30 and each of the first and second guides.

In some embodiments, the gripper 10 may further comprise a second finger 22 configured to translate along the guideway 14. The second finger 22 has a magnet 23 with a north pole (N) and a south pole (S). The magnet 23 is disposed in the second finger 22 such that a magnetic force acting on the magnet 23 causes the second finger 22 to move—i.e., translate along the guideway 14. For example, the magnet 23 is configured such that a repelling force at the north pole of the magnet 23 will cause the second finger 22 to move in a direction away from the repelling force (in an N→S direction with respect to the magnet 23). Similarly, a repelling force at the south pole of the magnet 23 will cause the second finger 20 to move in a direction away from the repelling force (in an S→N direction with respect to the magnet 23). The first finger 20 and the second finger 22 may be arranged such the fingers are operable to grip an object when the fingers are moved towards each other, and the object may be released when the fingers are moved away from each other.

The gripper 10 may have a third guide 34 having a magnet 35 with a north pole configured to cooperate with the north pole of the second finger 22 magnet 23 to cause a repulsive force between the third guide 30 and the second finger 22. The second actuator 42 may be operable to move the third guide 34. The gripper 10 may also include a fourth guide 36 having a magnet 37 with a south pole configured to cooperate with the south pole of the second finger magnet 23. In this way, the fourth guide 36 causes a repulsive force between the fourth guide 34 and the second finger 22. As the third guide 34 and the fourth guide 36 each cause repulsive forces acting on the second finger 22 in opposite directions, the second finger 22 will find an equilibrium point between the third guide 34 and the fourth guide 36. The first actuator 40 may be operable to move the fourth guide 36.

Although the present disclosure details embodiments of a gripper finger and embodiments of grippers having two fingers, it should be noted that the scope of the present disclosure includes embodiments having additional fingers—i.e., grippers with three or more fingers. Such additional fingers may be similar in design as the first and/or second fingers detailed herein. For example, such additional fingers may have a corresponding number of guides and magnets configured to move the additional fingers and/or alter the compliance of the additional fingers in the same manner as herein described.

Figure 5:
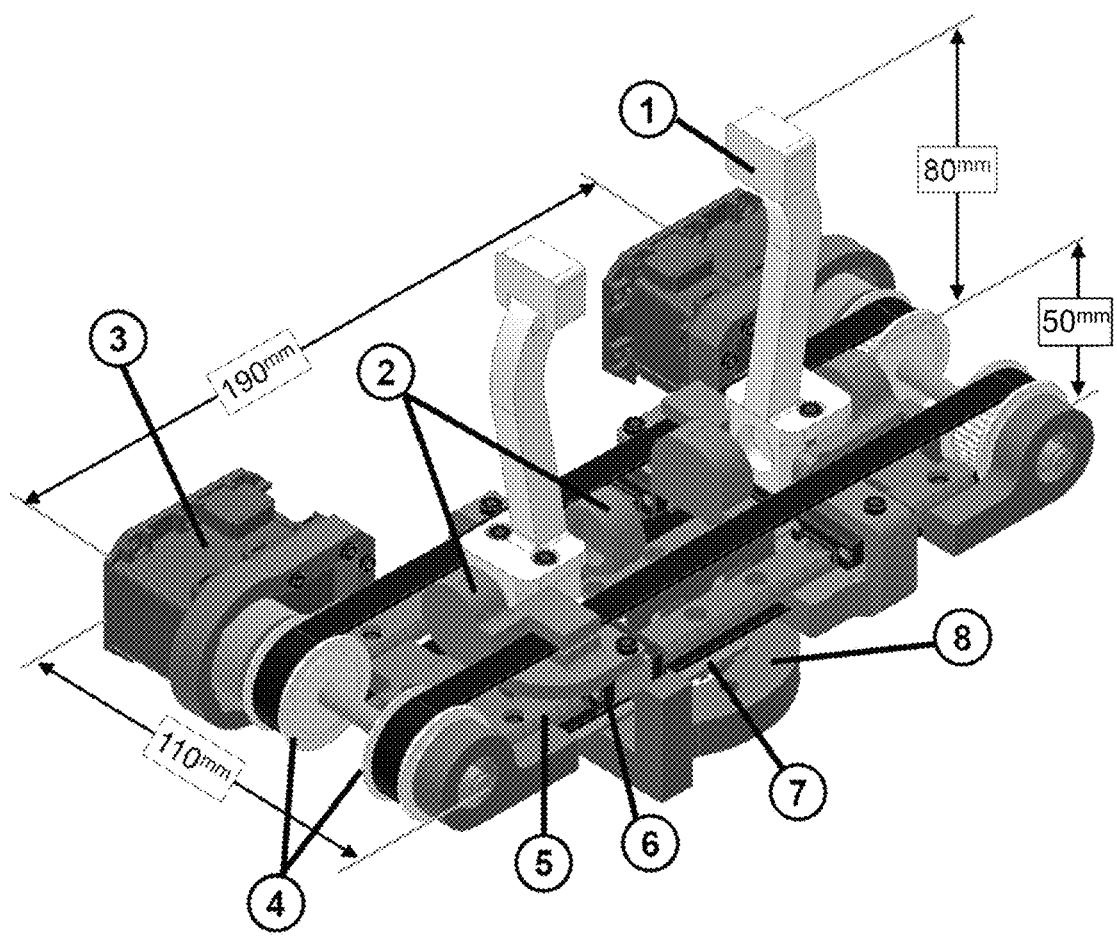
FIG. 5 shows an assembly model of an embodiment of a gripper according to the present disclosure. Two servo motors actuated four magnets to adjust the position and stiffness of two passive magnets which are connected to the fingers. The main components of the model include (1) gripper finger, (2) magnet holders, (3) servo motor, (4) passive and fixated pulleys, (5) linear guideway, (6) ball bearing block, sliding potentiometer and (8) end-effector adapter.

The gripper may further comprise a first drive belt arranged generally parallel to the guideway (see, e.g., FIG. 5). The first guide is attached to the first drive belt. The first actuator is configured drive the first drive belt, thereby causing movement of the first guide. For example, the first actuator may have a sprocket configured to engage the drive belt. A second drive belt may be arranged generally parallel to the guideway. In such an embodiment, the second guide is attached to the second drive belt. The second actuator may be configured to move the second guide by driving the second drive belt. In embodiments with a third guide and a fourth guide, the third guide may be attached to the second drive belt and configured to move in a direction opposite that of the second guide. Similarly, the fourth guide may be attached to the first drive belt and configured to move in a direction opposite that of the first guide. For example, as shown in FIG. 5, the first guide may be attached to a first length of the first drive belt which is driven between a first pair of sprockets in a first belt direction, and the fourth guide may be attached to a second length of the first drive belt which is driven between the first pair of sprockets in a second belt direction (opposite that of the first belt direction). Similarly, the second guide may be attached to a first length of the second drive belt which is driven between a second pair of sprockets in a first belt direction, and the third guide may be attached to a second length of the second drive belt which is driven between the second pair of sprockets in a second belt direction (opposite that of the first belt direction). In this way, each of the first and second drive belts may be operated to simultaneously move the first and second fingers in opposite directions. Additionally, each of the first and second drive belts may be operated to simultaneously increase or decrease the compliance of both of the first and second fingers.

In another aspect, the present disclosure may be embodied as a method 100 for changing the position and/or compliance of a finger of a robotic gripper. The method 100 includes providing 103 a magnet connected to the finger of the gripper, the magnet having a north pole and a south pole. By connected to, the magnet may be disposed on, in, or partially in, the finger or otherwise directly or indirectly connected to the finger, for example, by way of a linking member or the like. A pair of guides is provided 106, where each guide is configured on an opposite side of the finger with respect to each other. Each guide has a guide magnet with a magnetic pole configured to maintain a gap between the finger and the respective guide by repelling the corresponding pole of the finger magnet. The method 100 includes moving 109 each guide of the pair of guides in the same direction. By moving 109 the pair of guides in the same direction, the guide magnets will act on the finger magnet to change the position of the finger. The method 100 may include moving 112 each guide of the pair of guides away from each other (in opposite directions). In this way, the compliance of the finger will be increased because of the increased distance between the guide magnets and the finger magnet. The method 100 may include moving 115 each guide of the pair of guides toward each other (in opposite directions). In this way, the compliance of the finger will be decreased because of the decreased distance between the guide magnets and the finger magnet.

Further Discussion of the Design

The following is a description and discussion of further embodiments of the present device and method, intended to be illustrative and not limiting in any way unless expressly stated.

An advantage of the presently-disclosed gripper is simultaneous stiffness control and position control of the parallel jaws using two identical actuators connected to compliant elements. In addition, due to the need, in some applications, for attaching the gripper to an end-effector of a lightweight robotic arm, there may be a limitation in terms of size and weight of the gripper. A feature advantageous for generating stiffness variation in spring preload mechanisms is the non-linearity of springs. This feature offers the capability of smooth transition between different levels of stiffness. In some embodiments of the present disclosure, permanent magnets in repulsive configuration are employed to fulfill the requirement of non-linear springs. Magnets can provide the system with not only compactness and lightness, but also non-contact force interactions between the actuators and the load. Such features make magnets a good candidate for replacement of mechanical springs in manipulation applications by offering a number of advantages such as precise force transmission and tolerance to misalignments.

Figure 3:
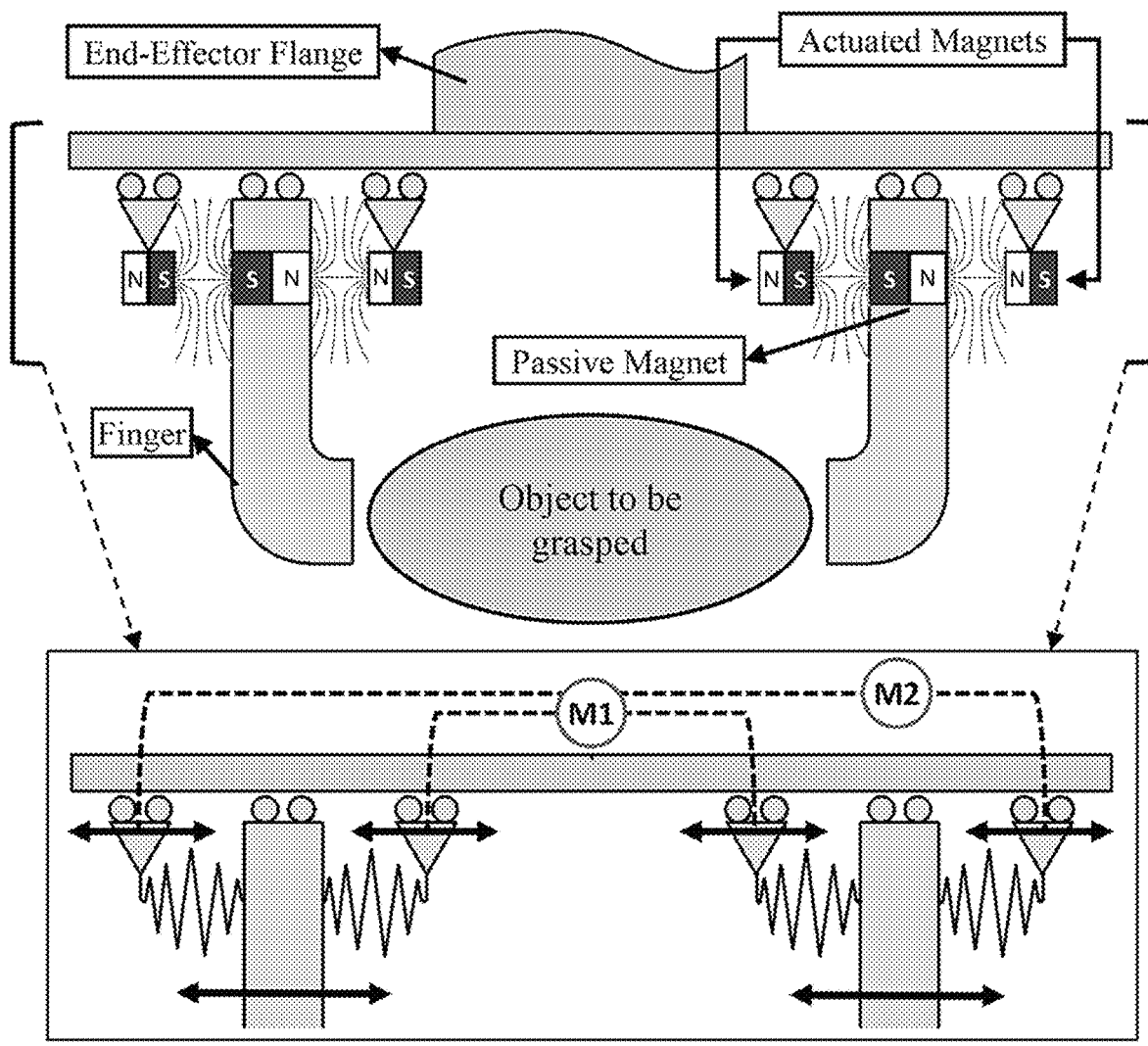
FIG. 3 is a schematic of an embodiment of the design concept, wherein permanent magnets in repulsive configuration are used as an alternative to the non-linear springs illustrated in the lower image. Two motors (M1 & M2) are used to control the positions of the actuated magnets.

A schematic of the conceptual design for the gripper mechanism is illustrated in FIGS. 2 and 3. Based on the presently-disclosed concept, the position of the fingers which are mounted on passive magnets can be controlled via translational motion of the actuated magnets (guide magnets). Basically, in the absence of external forces and neglecting the effect of gravity, each finger tends to stay in the equilibrium position which is at the middle of the two actuated magnets. In this configuration both of the magnetic springs and actuators are placed in an antagonistic setup. As a result, simultaneous control of the position and stiffness of the fingers can be achieved by position control of the actuated magnets. To achieve a symmetric motion of fingers, the displacements of the outer guide magnets (e.g., magnets 33 and 35) are equal and in opposite directions, while having a same motion synchronization for the inner magnets (magnets 31 and 37). Therefore, two motors can satisfy the position control of the four actuated magnets which are illustrated in FIG. 3. Through this design concept, the position and stiffness setup of the fingers can vary by changing the positions and air gaps between the passive and actuated magnets.

Similar to the most of the VSAs presented in the literature, the current system is capable of measuring contact forces with no need for force/torque sensors and the amount of a force acting in the direction of the finger axis can be measured based on the deviation from the equilibrium position. However, the present design offers two main characteristics for a gripper with parallel jaws.

Figure 4A:
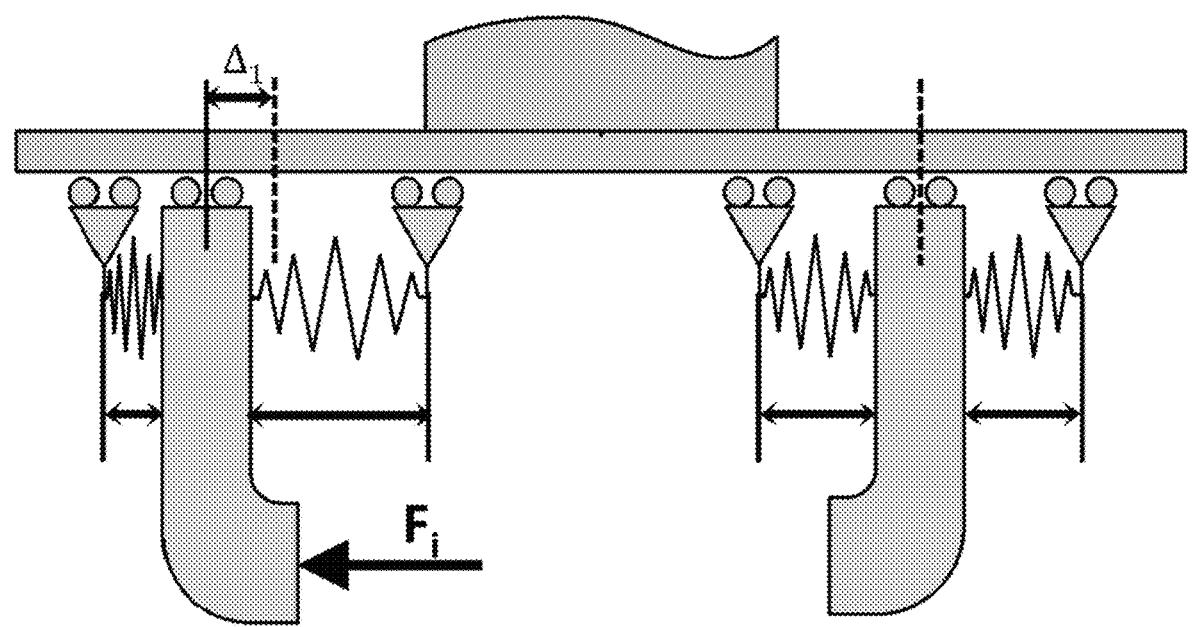
FIG. 4A is a diagram showing passive movement of a single finger due to an external force.

The first characteristic is the ability to measure contact forces acting on each finger individually. To this end, two linear position sensors (e.g., sliding potentiometers or the like) are used to measure the displacements of passive magnets. By having the positions of the magnets, the direction and amount of the contact forces can be estimated for each finger using magnetic repulsion force models. This property can improve the functionality of the gripper especially in the tasks with uncertainties in the location of the object before grasping task (see FIG. 4A).

Figure 4B:
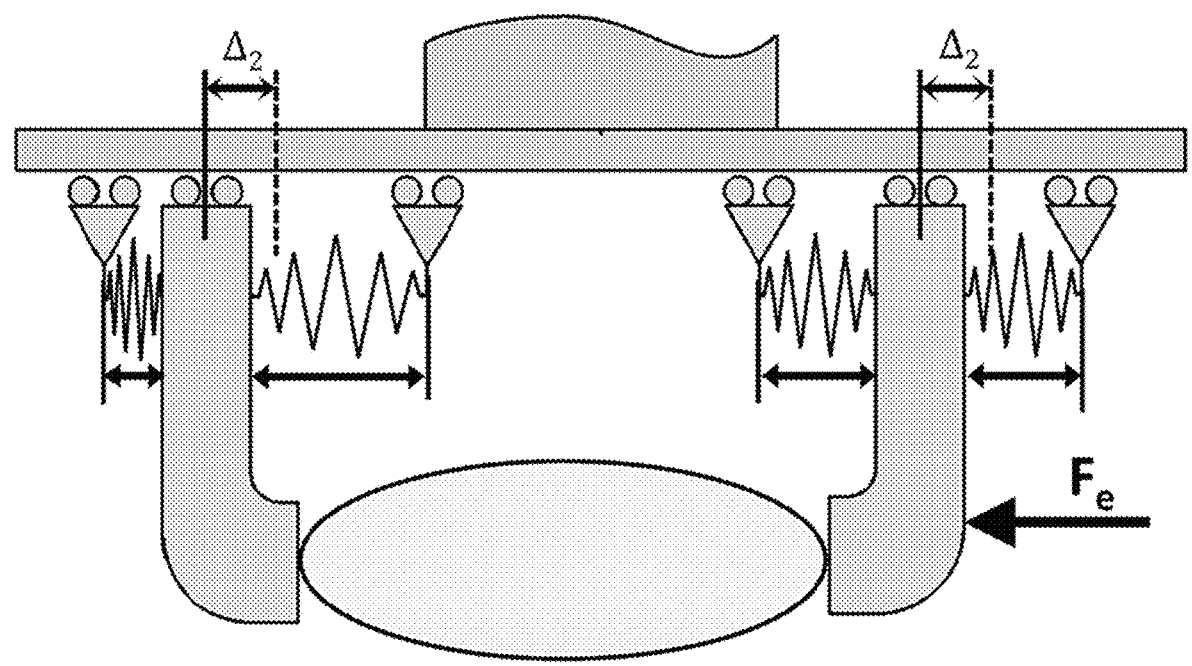
FIG. 4B is a diagram showing simultaneous passive movements of the fingers when an external force acts on the outer side of a finger.

Furthermore, this mechanism provides the gripper with a compliance in the direction of fingers axis when an object is grasped and an external contact force exerts at the outer side of the fingers (shown in FIG. 4B). In such situations, the compliance of the gripper can protect the object from high impact forces. This property can also improve the safety aspects of grasping particularly in industrials robots, where, fast stop methods rely mostly on the mechanisms without the capability of energy storage such as electromagnetic brakes. In such cases, braking after fast motions may lead to the jerky oscillations of the end-effector (due to the inherent stiffness of joints and gear trains) that increase the risk of grasp failure.

Mechanical Design

FIG. 5 illustrates the overall assembly model of an exemplary gripper along with the dimensions. In this model, timing belts are used to transfer the rotational motion of the actuators to translational movement of the magnets. Because each pair of the actuated magnets (the outer and inner magnets) are required to move simultaneously in opposite directions and the same rates, both sides of each belt are used to transfer actuator forces to the magnets. Each motor axis is passed through two pulleys, an active pulley fixated on the motor axis to drive the belt and a passive pulley equipped with a bearing to support the other belt. In this exemplary embodiment, each pulley has a pitch diameter of 25.4 mm.

Two servo motors (Dynamixel RX-24F) are used to drive the belts and magnets. In this example, the positions of the magnets are controlled via position control of the servo motors with a resolution of 0.29 degrees. Linear recirculating ball bearings and guideways are used as the rail and guiding elements for translational motion of the passive and actuated (e.g., belt-driven) magnets. These components offer smooth, precise motion with low friction and high rigidity that is advantageous for an accurate grasping task. Due to the non-contact nature of magnetic forces, the only frictional term acting on the motion of the fingers corresponds to the sliders.

Two sliding potentiometer sensors with analog output are attached to the guideways to measure the positions of the fingers, while the angular rotations of the servo motors may be used to calculate the displacements of the actuated magnets. In the exemplary embodiment, a 10-bit analog-to-digital interface is employed to convert the output of the sliding potentiometers to displacement values with a resolution of 0.06 mm. Similarly configured neodymium magnets may be used as the passive and active magnets of the system. The magnets may be shaped as cylinders, though other shapes may be used. The size and flux density of the magnets can be chosen in order to meet the stiffness-force requirements for specific applications. In a experimental gripper, 3D printing was used to create the gripper body and the connection links between mechanical components. The gripper was mounted at the end-effector of a lightweight 6-axis robotic arm which was controlled and dynamically identified previously for the experimental purposes.

Modeling

Magnetic Repulsion Force

In general, analytically modeling the attractive and repulsive forces between two magnets is not an easy operation and it depends on a number of parameters such as flux density, geometry, orientation, and air gap between the magnets. However, by the assumption of uniform magnetization, a mathematical model to estimate the magnetic repulsion between two cylindrical magnets was proposed in a previous work. Based on this model, the repulsive force between two aligned cylindrical magnets with a radius of R and height of h is given by, $$F_m(s) = \frac{\pi \mu_0 M^2 R^4}{4} \left[ \frac{1}{s^2} + \frac{1}{(s+2h)^2} - \frac{2}{(s+h)^2} \right], \quad (1)$$

where $F_m$ is the repulsive force, s is the air gap between the magnets, $\mu_0$ is the permeability of vacuum ($4\pi \times 10^{-7}$ T·m/A), and M is the magnetization of the magnets. For the exemplary case of employed neodymium magnets, the magnetization is approximately equal to $6.05 \times 10^5$ (A/m) as reported by the manufacturer's datasheet.

Figure 6A:
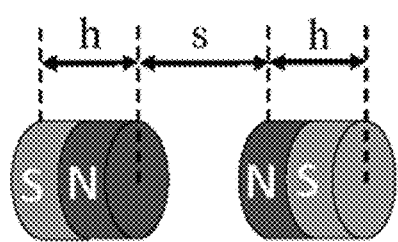
FIG. 6A is a schematic of interaction between cylindrical magnets versus electric dipoles.
Figure 6B:
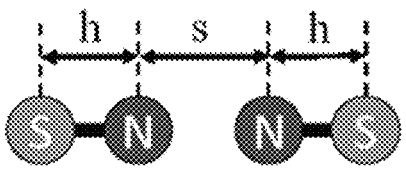
FIG. 6B is a schematic of interaction between cylindrical magnets in a repulsive configuration.
Figure 6C:
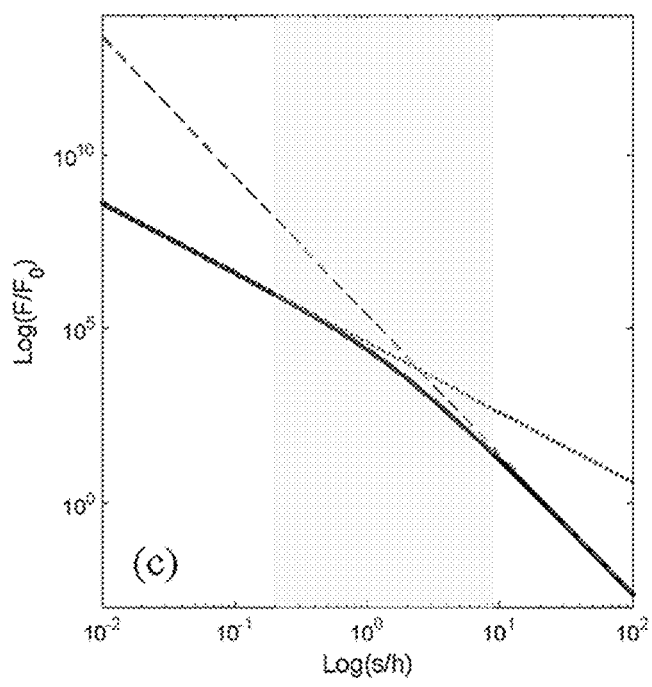
FIG. 6C is a graph showing the log-log of the force vs. s/h given by Eq. (1) (solid line) compared to two limit cases. First, the limit case of $F_m \propto 1/s^2$ for small distances (dashed line). Second, the limit case of $F_m \propto 1/s^4$ for large distances (dotted line). Shaded area of the graph demonstrates the functional range of magnets interaction for the designed gripper.

In fact, the expression of Eq. (1) is composed of the force interaction components between two electric dipoles (FIG. 6B), where the first term inside the bracket corresponds to the force between the nearest poles (N-N), the second term denotes the force between distant poles (S-S), and the third term is the attraction force between the opposite poles (N-S). Based on this relation, the repulsion force for large air gaps (s≫h) is proportional to an inverse power law of the form $F_m \propto 1/s^4$, while it becomes $F_m \propto 1/s^2$ for small air gaps (s≪h). This is illustrated in FIG. 6C with the help of a log-log graph.

Since Eq. (1) is based on the assumption of uniform magnetization and ideal magnets, an experiment was conducted to verify the accuracy of this model for the specific case of our gripper. A force sensor was used to measure the actual repulsive forces between two cylindrical neodymium magnets at different distances. In this setup, the same linear unit and guiding elements used in the gripper were used to generate translational motion between two magnets. This gives the possibility of investigating the effect of force hysteresis caused by the friction of the gripper mechanism in loading and unloading motions.

Figure 7:
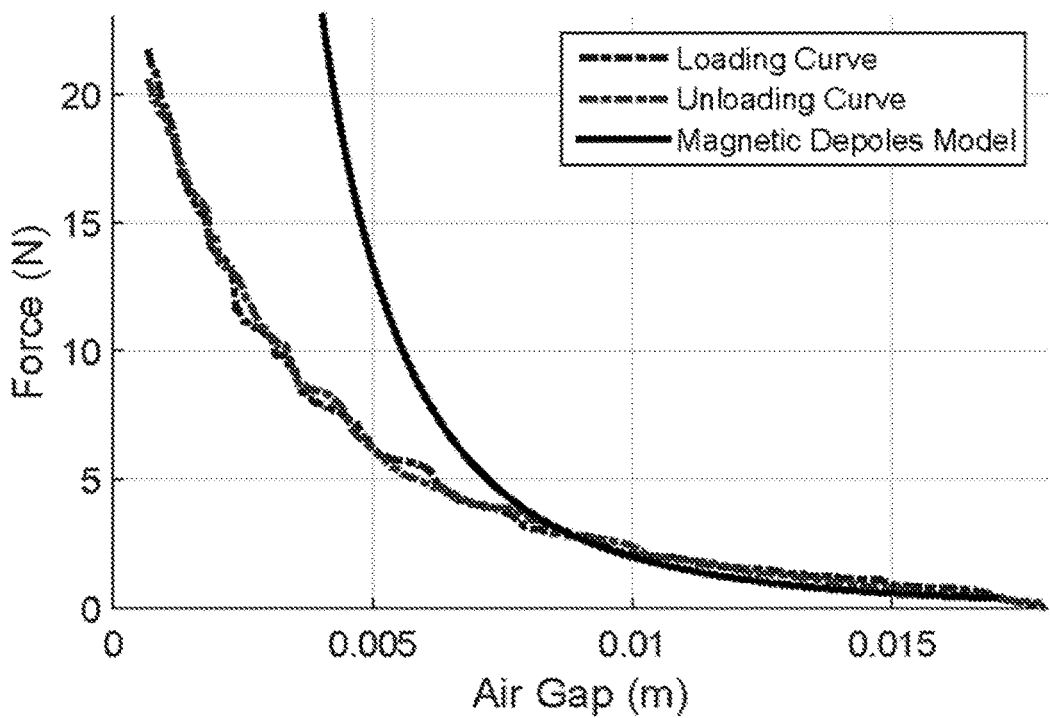
FIG. 7 is a graph wherein the dashed curves represent the measured repulsion force of a loading and unloading motion, respectively. The solid curve demonstrates the corresponding analytical force given by Eq. (1).

FIG. 7 illustrates the experimental measurements of magnetic repulsion versus air gap between magnets in loading and unloading motions. The frictional losses in the mechanism can be measured by calculating the area enclosed within the loading and unloading curves as a hysteresis effect. However, small differences between loading and unloading curves reported in FIG. 7 demonstrates a low frictional loss in the gripper mechanism. The root mean square (RMS) of the difference between the two curves was 0.34 N which is less than 1.5% of the maximum force.

Comparison between the experimental measurements and the curve generated by Eq. (1) reveals a significant difference between the actual and analytical models, especially for small air gap to magnet height ratios $$\left(\frac{s}{h} < 1.5\right).$$

Disassociation of the experimental and analytical models of Eq. (1) for small distances between the magnets was also observed in previous research, and this suggests the use of curve fitting methods to model repulsion force for stiffness modeling and taking into account the effect of non ideal magnets. A modified inverse power law which is expressed in Eq. (2) was used for fitting to the experimental measurements. In this model, a, b and c are the model parameters, p is the power degree, and s is the air gap between the magnets.

$$F_m(s) = \frac{a}{s^p + bs + c} \quad (2)$$

Figure 8:
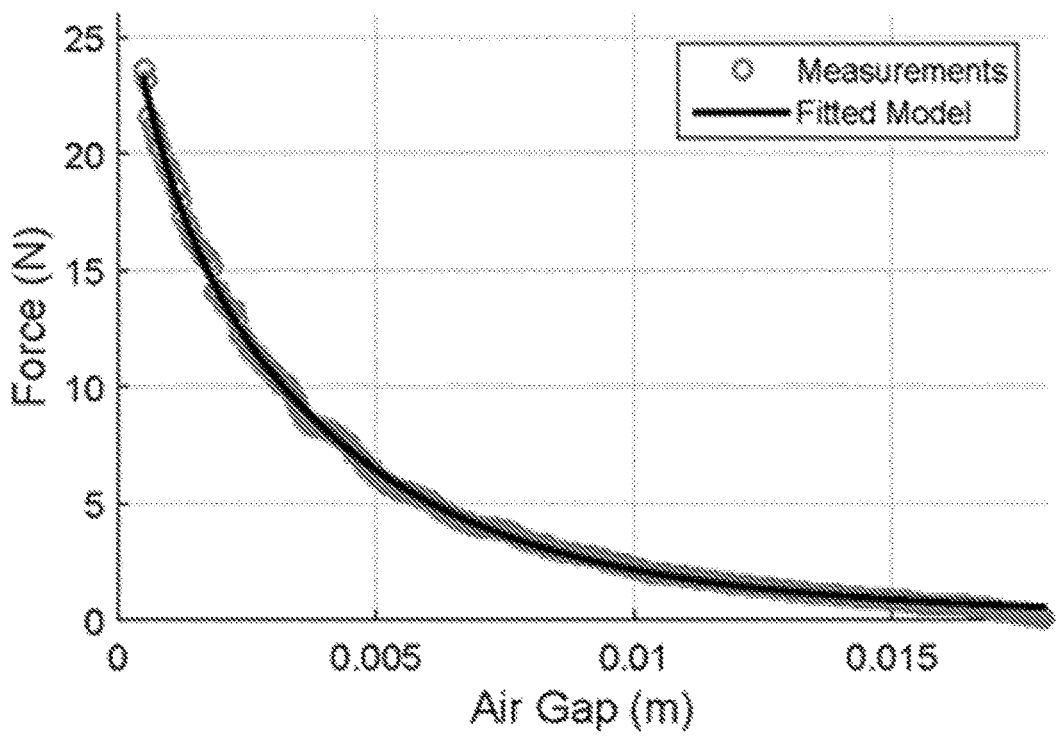
FIG. 8 is a graph showing experimental measurements (gray circles) and the fitted model (black line) of magnetic repulsion force based on Eq. (2) for p=3 and identified parameters as a=4.5 e-6, b=8.7 e-5 and c=1.5 e-7 ($R^2$=0.998 and RMSE=0.29N).

With reference to FIG. 6C, it is illustrated that for the case of the present gripper, $\log_{10}(s/h)$ is in the range −1 to 1. Therefore, a value of about 3 for p was expected to show a good fit. Nonlinear least squares method was used to find the parameters of Eq. (2) to fit the model to experimental data. Eq. (2) with p=3 demonstrating a good fit and the result of the fitted curve is shown in FIG. 8.

Stiffness

Based on the antagonistic actuation design of the gripper, translational motions of the fingers can be controlled through a combination of actuation inputs, whereas, antagonistic setup of the preload magnetic springs provides the system with the possibility of changing the stiffness setup while keeping constant the position (before grasp) or contact force (after grasp) of the fingers. In fact, passive magnets tend to stay in the static equilibrium position between actuated magnets and altering the distance between them leads to the change of force-deflection characteristics of the fingers.

Figures 9A, 9B:
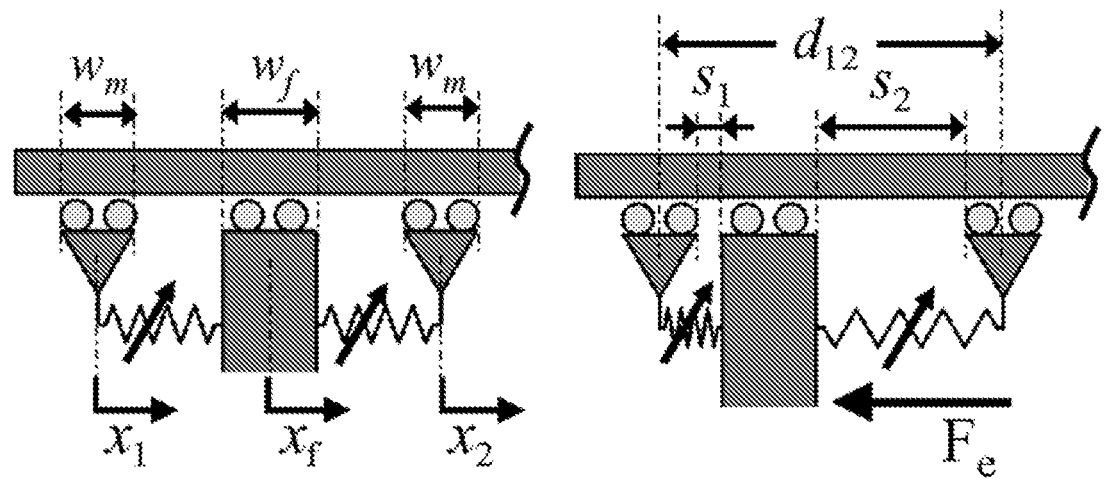
FIG. 9A is a diagram showing the static equilibrium position of the finger in the absence of an external force.
FIG. 9B is a diagram showing the static equilibrium position of the finger in the presence of an external force.

Let's assume that for one of the fingers the positions of the actuated magnets are defined as $x_1$ and $x_2$. In the case of identical actuated magnets and neglecting the effect of gravity and friction, the static equilibrium position of the finger ($x_f$) equals to $(x_1+x_2)/2$ (see FIG. 9A). However, when the gripper grasps an object or an external force acts on it, the equilibrium position of the finger alters (FIG. 9B). By considering the magnet repulsion as the main forcing factor the following statistical equation needs to be satisfied, $$\Sigma F = F_e + F_{m1} + F_{m2} = 0 \quad (3)$$

where, $F_e$ is the external force and $F_{m1}$ and $F_{m2}$ denote repulsive forces of the actuated magnets associated with coordinates $x_1$ and $x_2$. By considering the magnetic repulsion as a function of air gap between the magnets and substituting (2) in (3), the magnitude of the external force can be estimated by, $$F_e(s_1, s_2) = F_m(s_1) - F_m(s_2) = a\left[\frac{1}{s_1^3 + bs_1 + c} - \frac{1}{s_2^3 + bs_2 + c}\right] \quad (4)$$

where, $s_n$ denotes the distance from surfaces of the actuated magnet n to the passive magnet illustrated in FIG. 9B, while a, b and c are the parameters of the fitted model. As a result, mathematical expression of the stiffness for a given state can be derived using the chain rule, $$K(s_1, s_2) = \quad (5)$$
$$\frac{dF_e}{dx_f} = \frac{dF_{m1}}{dx_f} - \frac{dF_{m2}}{dx_f} = \frac{dF_{m1}}{ds_1}\frac{ds_1}{dx_f} - \frac{dF_{m2}}{ds_2}\frac{ds_2}{dx_f} = dF_m(s_1) + dF_m(s_2)$$

where, $$dF_m(s) = \frac{-a(3s^2 + b)}{(s^3 + bs + c)^2} \quad (6)$$

In addition, the distances between magnets ($s_1$ and $s_2$) can be calculated in terms of magnet positions ($x_1$, $x_2$, and $x_f$) as follows, $$s_1 = x_f - x1 - \frac{(w_m + w_f)}{2} \quad (7)$$

$$s_2 = x_2 - xf - \frac{(w_m + w_f)}{2} \quad (8)$$

where, $w_m$ and $w_f$ are the width of the holders of actuated and passive magnets, respectively, as shown in FIGS. 9A and 9B. Consequently, the above expressions of the force and stiffness can be rewritten as a function of the positions of the actuated and passive magnets. For the presented design, the magnet positions can be easily measured from motor rotations and sliding potentiometer sensors.

Figure 10:
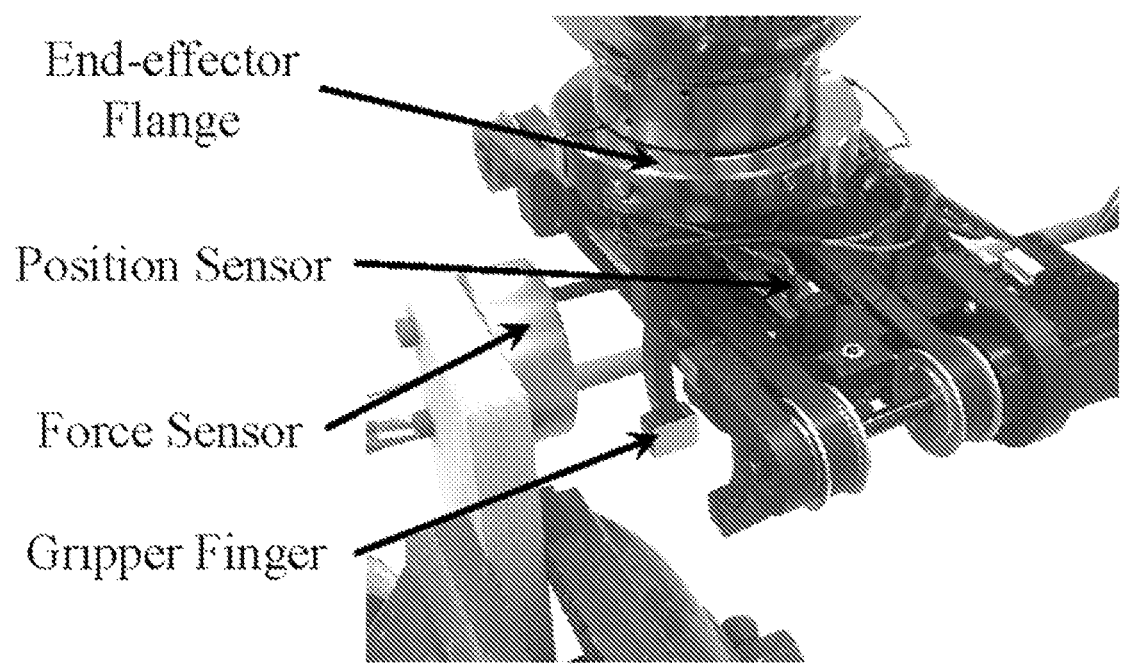
FIG. 10 shows an experimental setup for force-deflection measurements.

In order to assess the reliability of the fitted model for repulsion force estimation and examine the stiffness characteristics of the gripper, an experimental setup was assembled which is shown in FIG. 10. In this setup, the gripper was attached to the end-effector of a robotic arm and an external force was applied to one of the fingers due to the motion of the arm. The applied force to the finger was measured using a force/torque sensor, while the passive deflection of the finger was acquired from its position sensor simultaneously.

Figure 11:
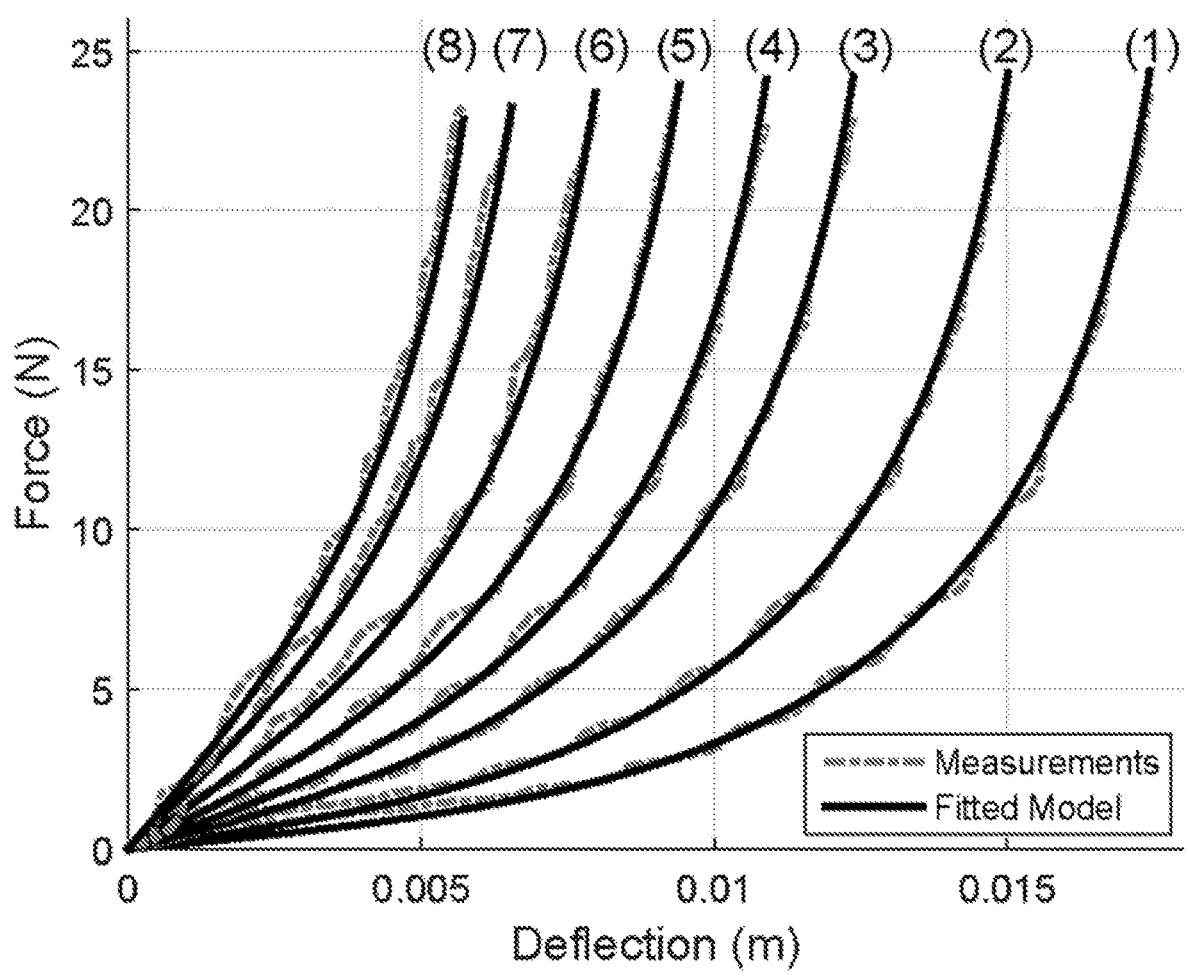
FIG. 11 is a graph showing the measured and estimated external force versus deflection. Different curves correspond to various setups of stiffness by changing the distance between the actuated magnets (d12). Starting from d12=32 mm, the distance is decreased with the steps of (1:2)=5 mm, (2:3)=5 mm, (3:4)=3 mm, (4:5)=3 mm, (5:6)=3 mm, (6:7)=3 mm, and (7:8)=1.5 mm.

By changing the distance between the actuated magnets ($d_{12}$), exerted forces were measured for different stiffness setups. Experimental results and their deviation from estimated forces obtained by Eq. (4) are shown in FIG. 11. The estimated forces demonstrate good agreements with the measured ones by an average RMS error of 0.43 N which is less than 2% of the maximum measured force.

Due to the preload spring setup and nonlinearity of the magnetic repulsion force, the stiffness increasingly varies by applying more deflection which results in a non-constant force-stiffness relation. This stiffening effect can protect the gripper from reaching the mechanical limits, however, real-time position control of the magnets may be necessary for the tasks in which constant stiffness is desired.

Figure 12A:
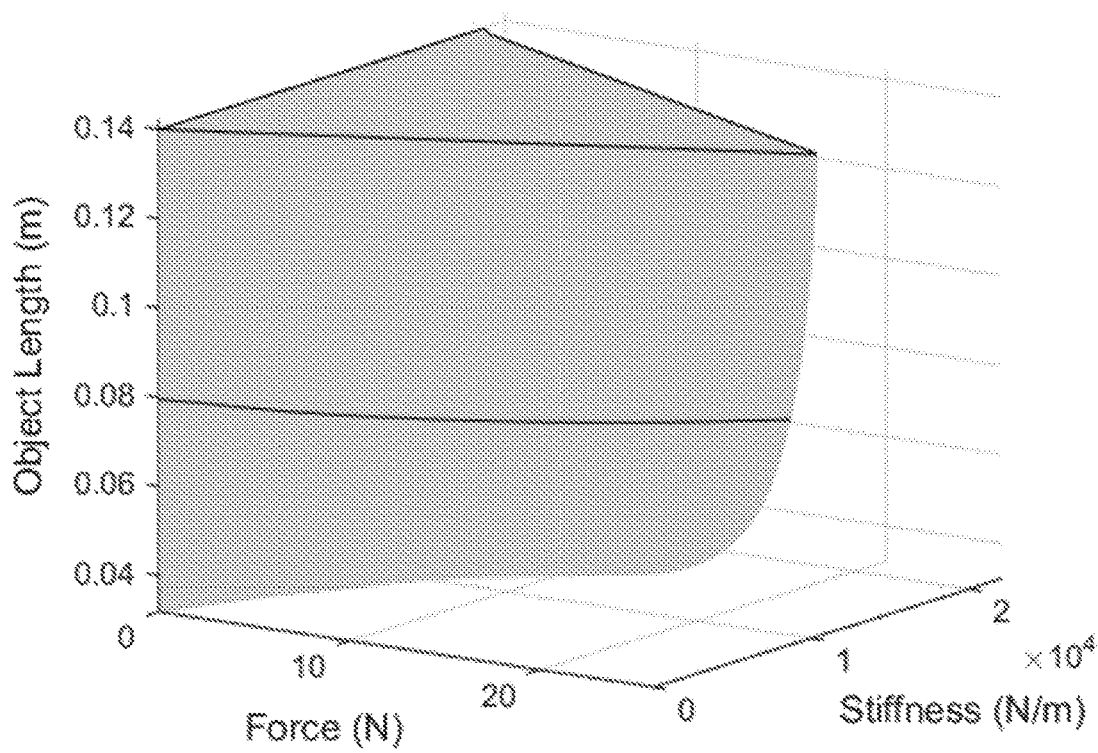
FIG. 12A is a diagram showing the stiffness-force relation for the feasible range of object lengths for an exemplary embodiment of the present disclosure.
Figure 12B:
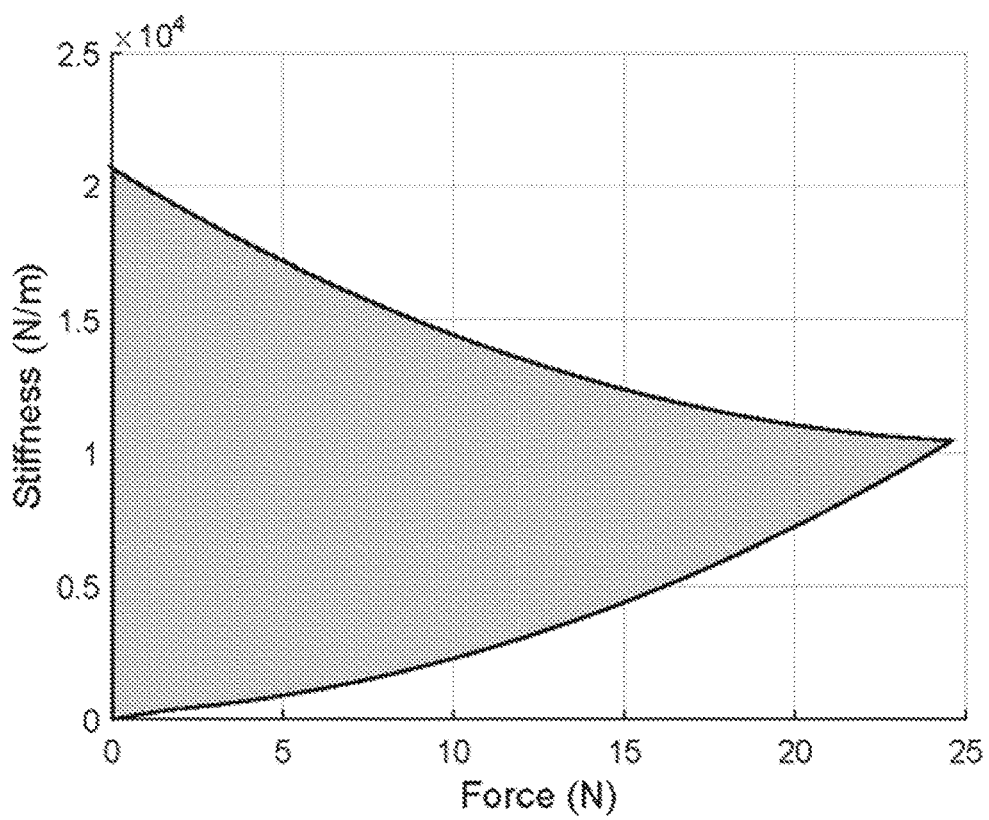
FIG. 12B shows a slice of FIG. 12A taken at object length 8 cm (labeled in FIG. 12A as "Slice A." The upper and lower curves demonstrate the stiffness bandwidth in the range of feasible forces.

The stiffness bandwidth at different amounts of external loads describes the stiffness variation performance of a variable stiffness mechanism. For the case of the exemplary gripper, however, the range of stiffness and force bandwidths vary by the positions of the fingers (or equivalently the length of the grasped object). This affects the stiffness-force performance of the gripper particularly in the case of small grasped objects, where the gripper fingers are close to each other. FIG. 12B illustrates the stiffness-force diagram for the feasible object lengths for the exemplary embodiment. This drawback is a result of a reduction in the range of feasible passive deflection due to the translational motion of the antagonistic magnets and parallel jaws of the gripper. The stiffness-force diagram of the gripper for a specific length of object is also shown in FIG. 12A. This figure visualizes the minimum and maximum bands of the feasible stiffness at different forces.

Collision Experiment

In this section, the results of an experiment are presented to demonstrate the functionality of the gripper in terms of compliant motion during collision. In fact, in this experiment, the simultaneous passive deflection of the fingers (as shown in FIG. 4B) was examined, when a fragile object was grasped with a low stiffness setup and a collision with a hard object occurred. For this experiment, a test gripper was mounted to the end-effector of a robotic arm. A predefined trajectory was tracked by the arm and an egg was grasped by the gripper to complete a pick and place task. However, the gripper collided with a heavy object after the grasping phase, while the gripper was moving at a speed of 25 cm/s.

A collision detection algorithm was used to stop the robotic arm from motion by triggering the electromagnetic brakes at the robot joints. In this algorithm, the absolute velocity of the simultaneous motion of the fingers was considered as the collision threshold. This velocity was computed based on a backward finite difference method which was applied on a moving window of the sensor data. For this experiment, a threshold of 32 mm/s was found to perform well in detecting the collisions. A small value of the threshold increases the sensitivity of the algorithm which may resulted in false stops due to the arm motions and change in the inertia of the grasped object, while, a large value of the threshold can fail to detect collisions.

Figure 13:
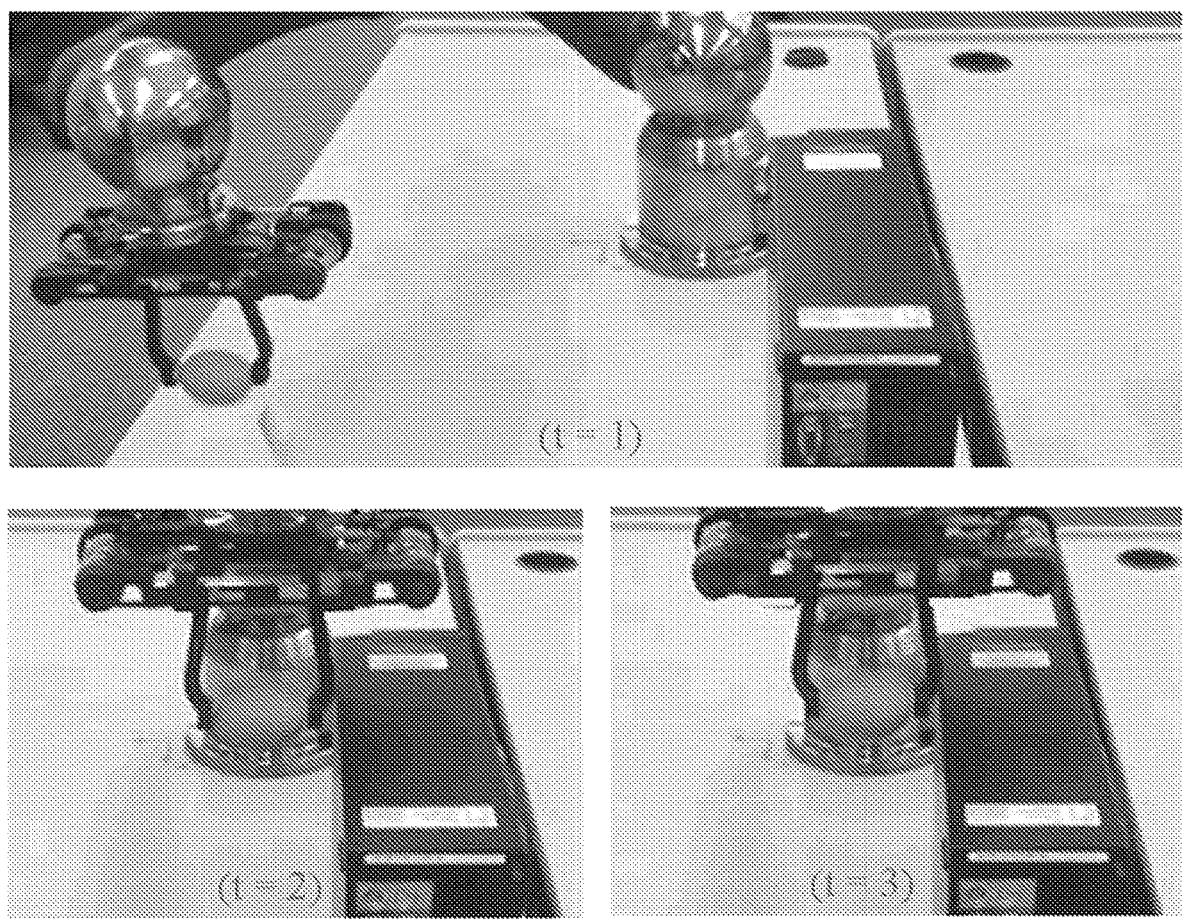
FIG. 13 is a sequence of images of the conducted experiment.
Figure 14:
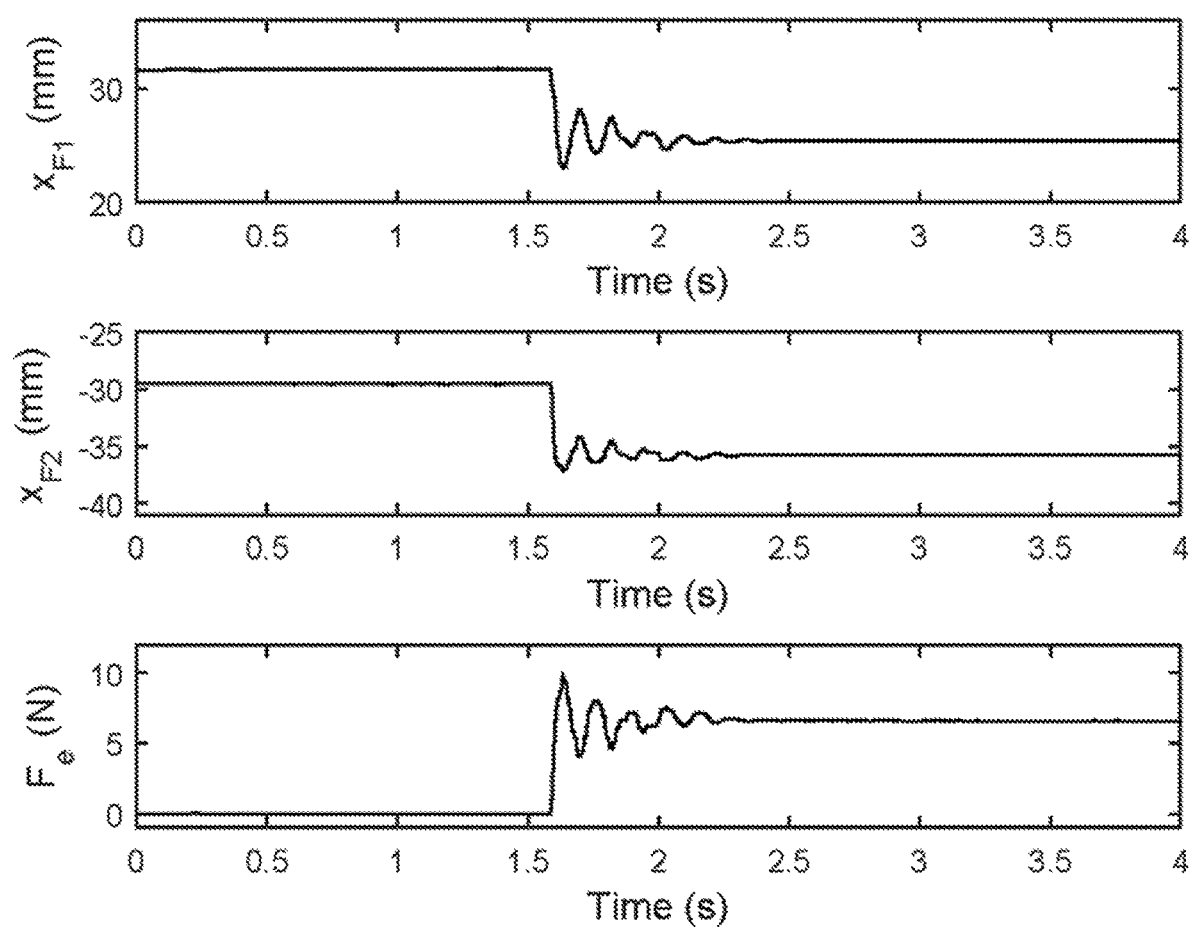
FIG. 14 is a set of graphs, wherein the top two graphs illustrate the passive motions of gripper fingers caused by a collision and the bottom graph is the estimated external force due to the collision.
Figure 15:
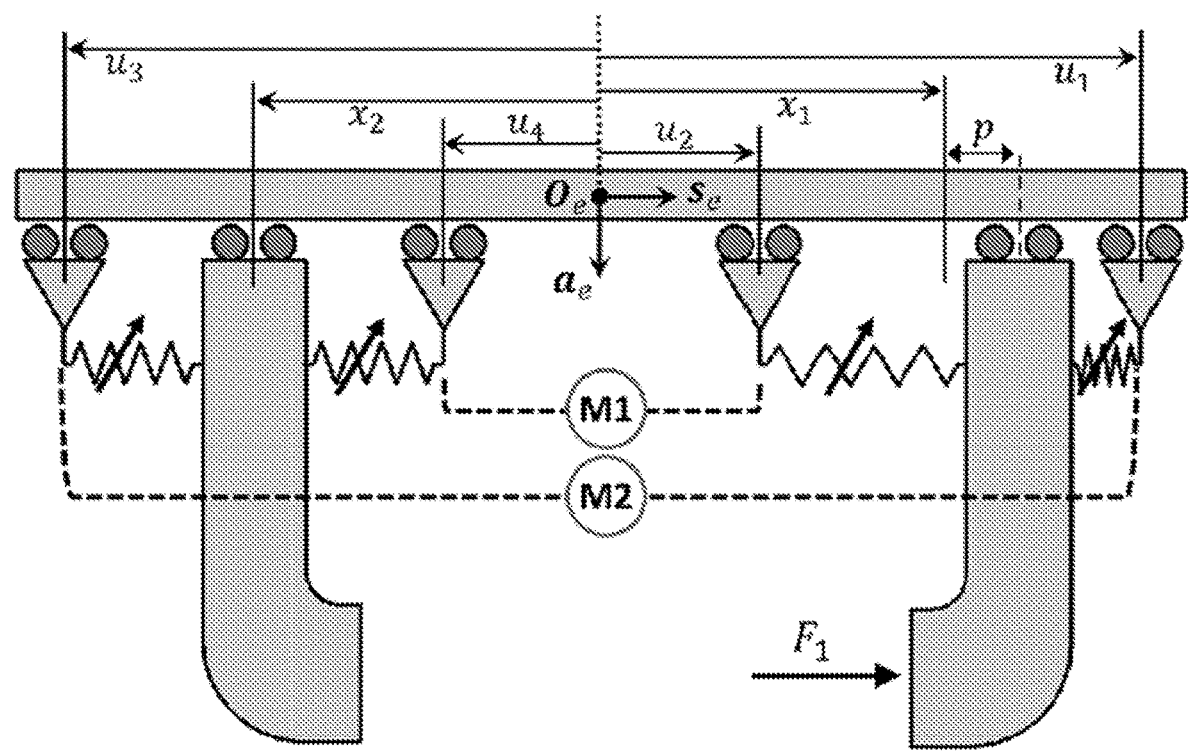
FIG. 15 is a diagram of another gripper according to an embodiment of the present disclosure.
Figure 16:
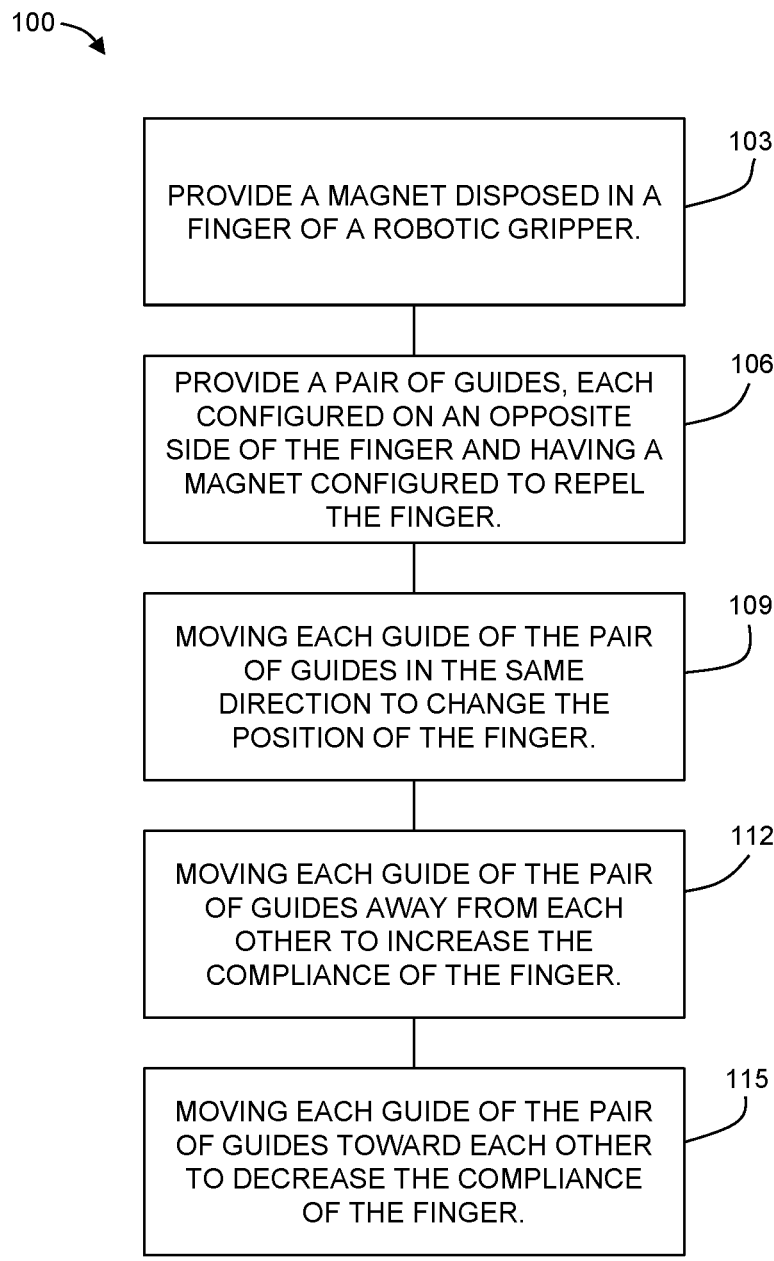
FIG. 16 is a chart of a method according to another embodiment of the present disclosure.

FIG. 13 shows the sequence of the collision in three instants recorded before and after the collision, while FIG. 14 illustrates the passive motion of the fingers and estimated external force during collision. The compliance of the mechanism resulted in displacement of the two fingers with a same rate while the grasped object remained safe and stable.

Although the present disclosure has been described with respect to one or more particular embodiments, it will be understood that other embodiments of the present disclosure may be made without departing from the spirit and scope of the present disclosure.

I claim:

1. A robotic tool, comprising:
    a frame having a guideway;
    a first finger having a magnet with a north pole and a south pole, the first finger arranged on the guideway such that a magnetic force acting on the magnet causes the first finger to translate along the guideway;
    a first guide having a magnet with a north pole configured to cooperate with the north pole of the magnet of the first finger to cause a repulsive force between the first guide and the first finger;
    a first actuator configured to move the first guide;
    a second guide having a magnet with a south pole configured to cooperate with the south pole of the magnet of the first finger to cause a repulsive force between the second guide and the first finger; and
    a second actuator configured to move the second guide.

2. The robotic tool of claim 1, further comprising a controller in electrical communication with each of the first and second actuators; and wherein the controller is configured to move the first finger along the guideway by moving the first guide and the second guide in the same direction as each other.

3. The robotic tool of claim 2, wherein the controller is further configured to increase the compliance of the first finger by moving the first guide away from the second guide thereby increasing the gaps between the first finger and each of the first and second guides.

4. The robotic tool of claim 3, wherein the controller is further configured to decrease the compliance of the first finger by moving the first guide toward the second guide thereby decreasing the gaps between the first finger and each of the first and second guides.

5. The robotic tool of claim 2, further comprising:
    a position sensor configured to determine a position of the first finger; and
    wherein the controller is further programmed to determine a magnitude of an external force applied to the first finger.

6. The robotic tool of claim 5, wherein the position sensor is a linear potentiometer.

7. The robotic tool of claim 1, wherein the first and second actuators are servo motors.

8. The robotic tool of claim 1, further comprising:
    a first drive belt arranged generally parallel to the guideway, and wherein the first guide is attached to the first drive belt and wherein the first actuator is configured to move the first guide by driving the first drive belt; and a second drive belt arranged generally parallel to the guideway, and wherein the second guide is attached to the second drive belt and wherein the second actuator is configured to move the second guide by driving the second drive belt.

9. The robotic tool of claim 1, further comprising:

a second finger having a magnet with a north pole and a south pole, the second finger arranged on the guideway such that a magnetic force acting on the magnet causes the second finger to translate along the guideway;

a third guide having a magnet with a north pole configured to cooperate with the north pole of the magnet of the second finger to cause a repulsive force between the third guide and the second finger, and wherein the third guide is attached to the second drive belt such that the third guide moves in a direction opposite that of the second guide;

a fourth guide having a magnet with a south pole configured to cooperate with the south pole of the magnet of the second finger to cause a repulsive force between the fourth guide and the second finger, and wherein the fourth guide is attached to the first drive belt such that the fourth guide moves in a direction opposite that of the first guide.

10. The robotic tool of claim 9, having more than two fingers and additional guides and magnets corresponding to the more than two fingers.

11. A method for changing the position and/or compliance of a finger of a robotic tool, comprising:

providing a magnet disposed in the finger of the robotic tool, the magnet having a north pole and a south pole;

providing a pair of guides each guide configured on an opposite side of the finger and having a guide magnet with a magnetic pole configured to maintain a gap between the finger and the respective guide by repelling the corresponding pole of the finger magnet; and changing the position of the finger by moving each guide of the pair of guides in the same direction as each other.

12. The method of claim 11, further comprising increasing the compliance of the finger by moving each guide of the pair of guides away from each other thereby increasing the gap between the finger and each guide.

13. The method of claim 11, further comprising decreasing the compliance of the finger by moving each guide of the pair of guides toward each other thereby decreasing the gap between the finger and each guide.

* * * * *